March 13, 1928. 1,662,473
H. C. RALSTON
SHEAR
Filed March 5, 1927 5 Sheets-Sheet 1

Witnesses:
Edwin Trueb

Inventor:
HARLEY C. RALSTON,
by D. Anthony Usina
his Attorney.

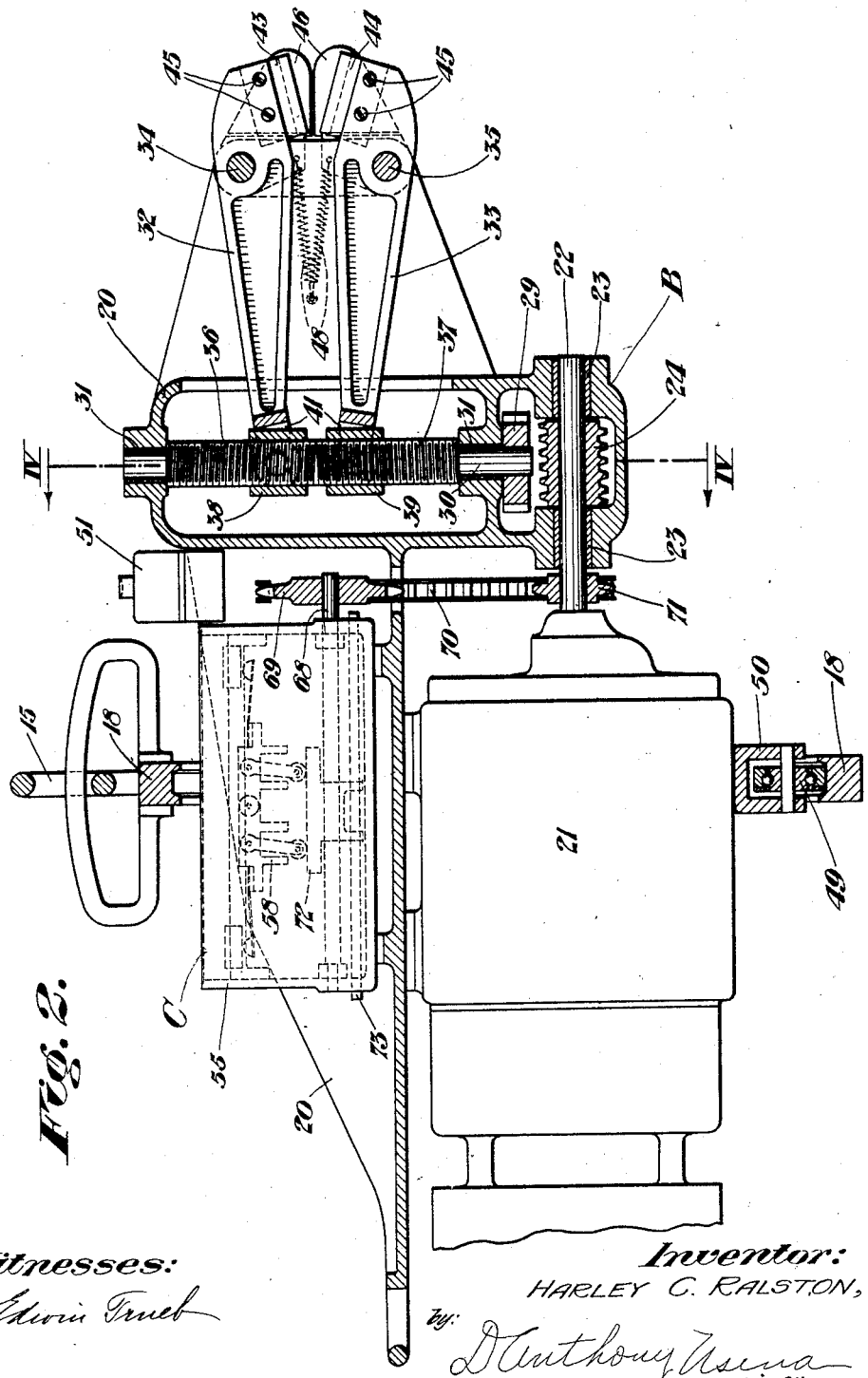

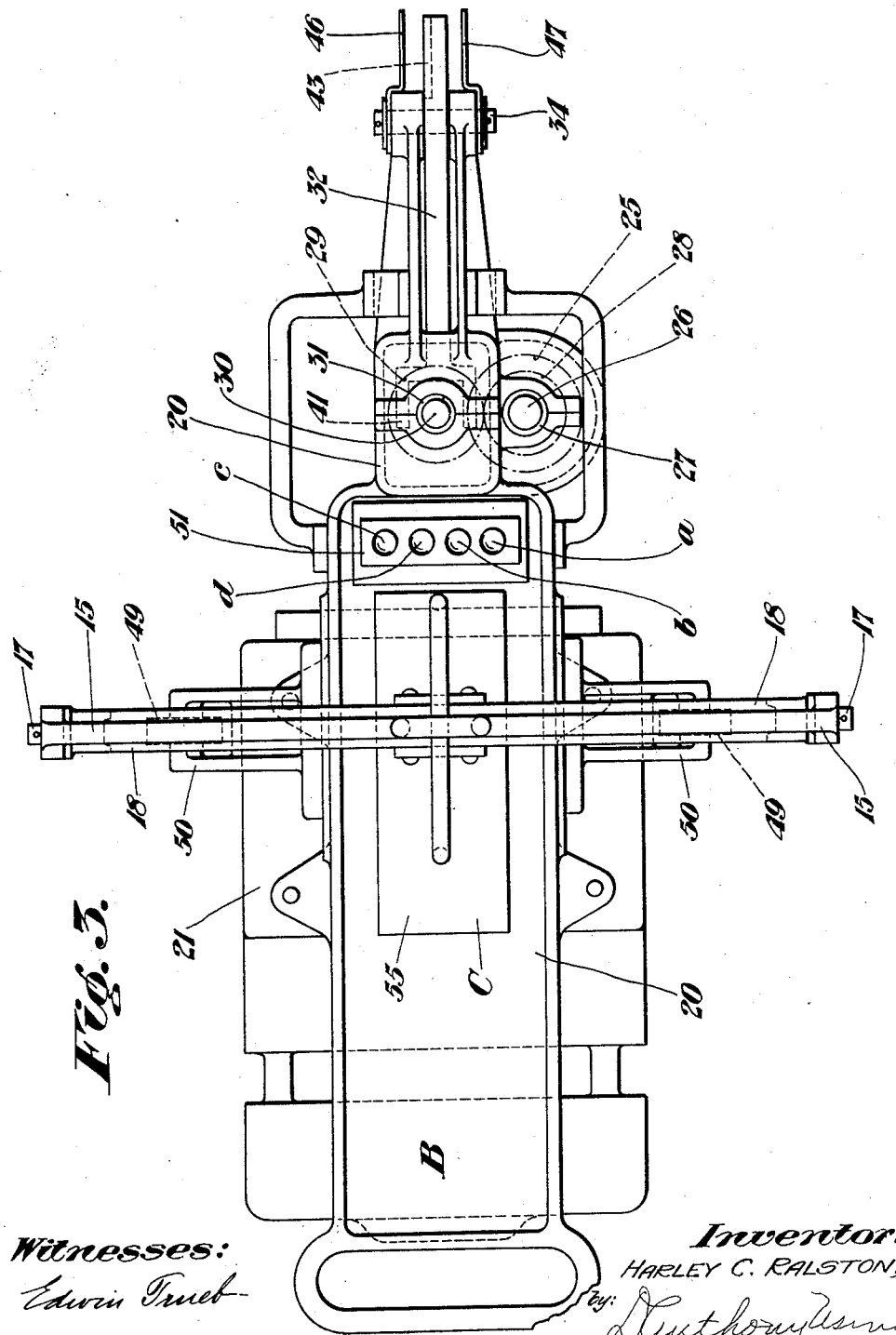

March 13, 1928. 1,662,473
H. C. RALSTON
SHEAR
Filed March 5, 1927 5 Sheets-Sheet 4
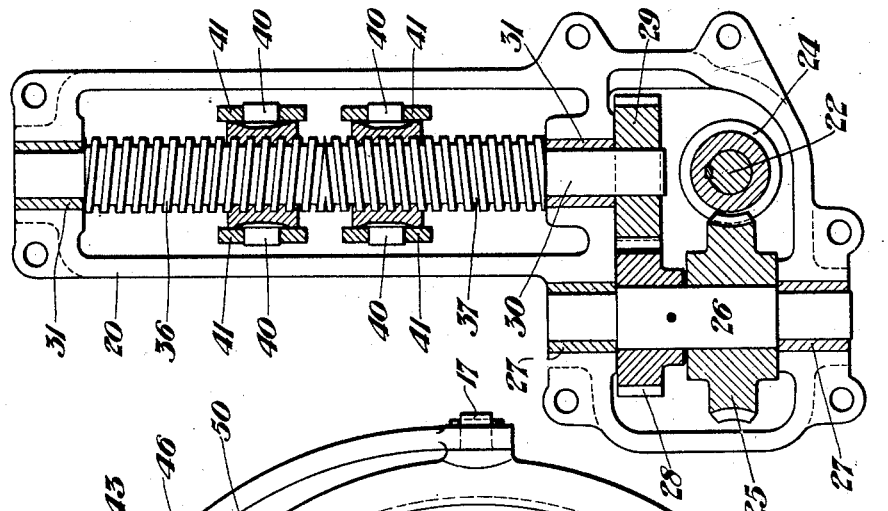
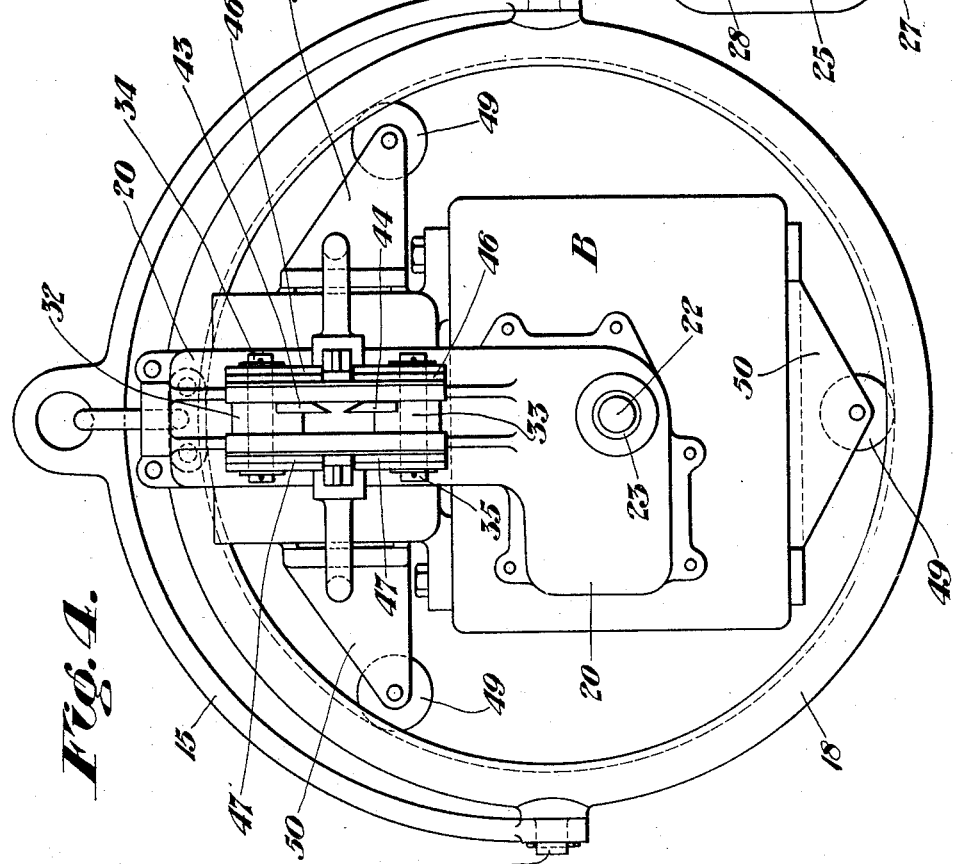
Witnesses:
Edwin Trueb
Inventor:
HARLEY C. RALSTON,
by D. Anthony Usina
his Attorney.

March 13, 1928. 1,662,473

H. C. RALSTON

SHEAR

Filed March 5, 1927 5 Sheets-Sheet 5

Witnesses:
Edwin Fruet

Inventor:
HARLEY C. RALSTON,
by D. Anthony Usina
his Attorney.

Patented Mar. 13, 1928.

1,662,473

UNITED STATES PATENT OFFICE.

HARLEY C. RALSTON, OF CLEVELAND, OHIO, ASSIGNOR TO THE AMERICAN STEEL AND WIRE COMPANY OF NEW JERSEY, A CORPORATION OF NEW JERSEY.

SHEAR.

Application filed March 5, 1927. Serial No. 173,101.

This invention relates to shears and more particularly to portable power shears for cutting bars, rods and the like, and has for its object the provision of a shear of this class which may be adjusted or moved universally so as to cut at any angle.

Another object is to provide a shear which is supended from an overhead traveling carrier or crane so that it may be readily raised and lowered and moved from place to place.

A further object is to provide an electrically powered shear having a novel semi-automatic control mechanism, which after being started in operation will automatically control the operation until the shearing is complete.

In the drawings—

Figure 2 is an enlarged sectional side elevation of the shear body.

Figure 3 is a top plan of the shear body.

Figure 4 is a front elevation thereof.

Figure 5 is a sectional elevation on the line IV—IV of Figure 2.

Figure 1:
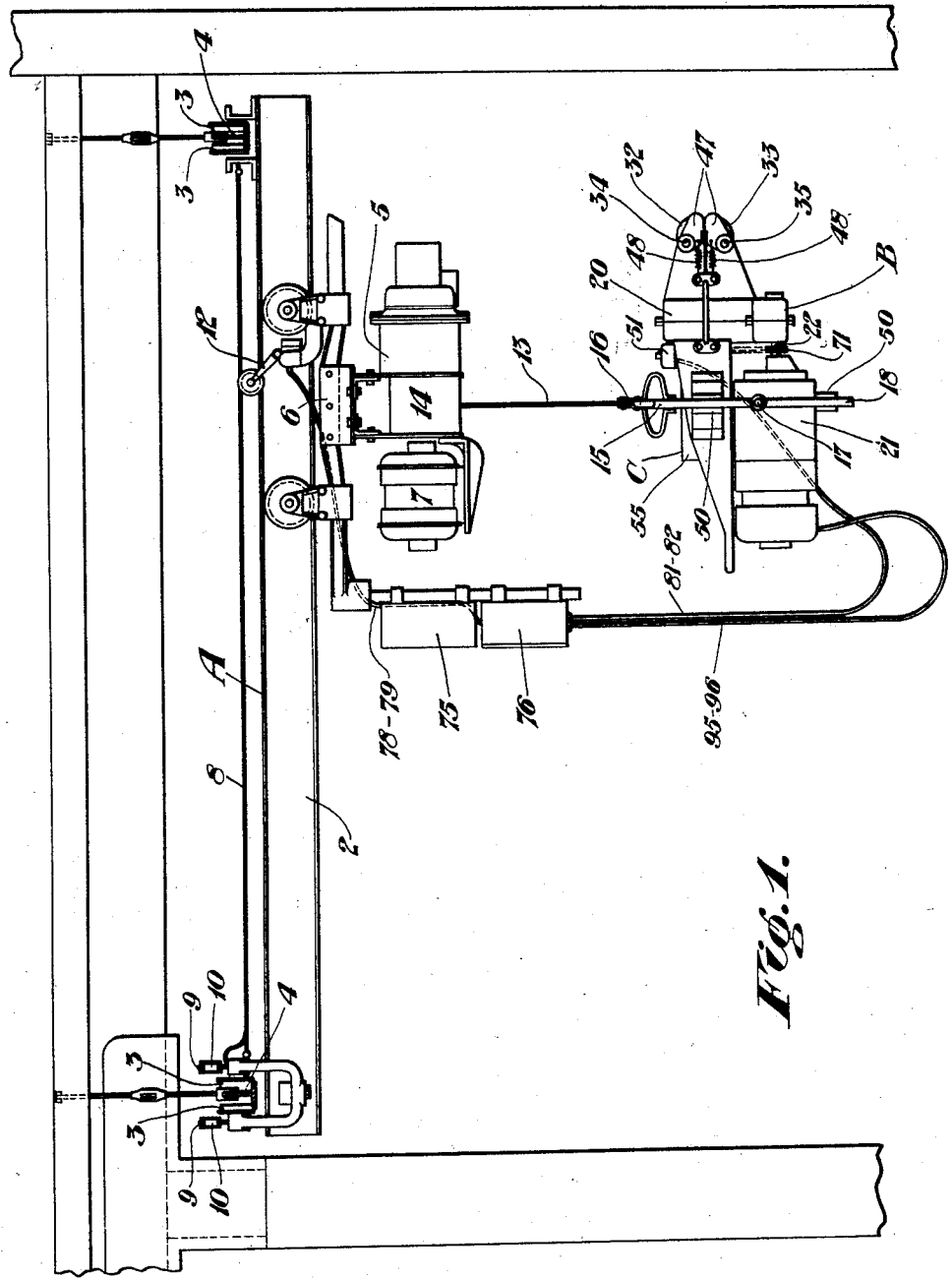
Figure 1 is a side elevation of a shear mechanism constructed in accordance with this invention.

Referring more particularly to the drawings, the letter A designates the crane as a whole, from which the shear is suspended. The crane A is of standard construction and comprises a bridge member 2 provided with flanged wheels 3 and adapted to travel along track members 4. A standard electrically operated crane trolley 5 having a wheeled carriage 6 is mounted on the bridge 2 and adapted to travel longitudinally thereof. The trolley 5 is operated by an electric motor 7 carried thereon. A pair of power lines 8 are mounted along the bridge 2 and are connected to a second pair of power lines 9 extending along one of the tracks 4 by a pair of trolley arms 10 mounted on the bridge 2. A second pair of trolley arms 12 are mounted on the crane trolley 5 and serve to collect the power from the power lines 8 and deliver it to power lines connected to the crane motor 7 and the motor of the shear. The usual lifting cable 13 is secured to the drum 14 of the crane trolley 5 and is adapted to be raised and lowered by the rotation of the drum when the motor 7 is energized.

A bail ring 15 is supended from the lifting cable 13 by a swivel connection 16 and has its end pivotally mounted over trunnions 17 on a circular grooved track ring 18 which supports a shear B.

The shear B has a housing 20 which encloses the working parts and also supports the reversing motor 21 for operating the shear.

The motor 21 has an extended armature shaft 22 which passes into the housing 20 and is journaled in bearings 23. The shaft 22 is provided with a worm 24 which is meshed with a worm-wheel 25 on a stub shaft 26 journaled in bearings 27 in the housing 20. The shaft 26 is also provided with a spur gear 28 which is meshed with a spur gear 29 on a vertical screw shaft 30 journaled in bearings 31.

A pair of shear arms 32 and 33 are pivotally mounted adjacent their forward ends on pivot pins 34 and 35, respectively, which are mounted in the housing.

The screw shaft 30 is provided with right and left-hand threaded portions 36 and 37, respectively, and threaded sleeves or nuts 38 and 39 are threaded on the respective threaded portions of said shaft.

The nuts 38 and 39 are each provided with trunnions 40, and the respective shear arms 32 and 33 have their rear ends provided with slotted ears 41 which fit over the trunnions 40 so that the respective shear arms are operatively connected to the respective nuts.

The forward ends of the shear arms 32 and 33 are provided with shear blades 43 and 44, respectively, which are detachably secured in place by screws or bolts 45.

Two pairs of shear blade guards 46 and 47, respectively, are mounted, one pair on each side of the housing. The guards 46 and 47 are pivotally mounted on the pivot pins 34 and 35 and are normally held in closed position by springs 48. The guards 46 and 47 are adapted to normally be held closed and to be opened when the shear is forced over the article to be cut.

The shear B as a whole is rotatably mounted in the circular grooved track ring 18 and for this purpose is provided with a set of three spaced anti-friction casters 49, which are mounted on brackets 50 on the shear and extend into the grooved track ring 18.

The operation of the shear as so far described is as follows—

The crane and crane trolley are first moved to position the shear B close to the work to be sheared; the electric motor 7 on the crane trolley 5 is then operated to raise or lower the shear B to the proper height for the work. After the shear B is thus positioned it may be tilted bodily by rotating the ring 18 on its trunnions, and may be swung horizontally due to the swiveled connection 16 between the bail ring 15 and lifting cable 13; or the shear may be rotated to different angles about its longitudinal axis by rotating the shear bodily in the track ring 18.

After the shear has been properly positioned, the shear will be forced over the work-piece to be sheared, and the motor 21 will then be energized so as to rotate the screw shaft 30 in a clockwise direction so as to cause the nuts 38 and 39 to move apart on the shaft 30 and thus rock the shear arms 32 and 33 about their pivots 34 and 35, respectively, so as to move their forward ends carrying the shear blades 43 and 44 together to shear the work-piece. After the work-piece is sheared, the motor 21 will be reversed to return the shear arms to their normal or open position.

A push button control 51, consisting of a casing and four buttons a, b, c, and d, is mounted on the shear housing. The buttons a, and b, are the control buttons for controlling the crane trolley motor 7, the details of this control being common in the crane art and standard construction, are not shown.

Figure 7:
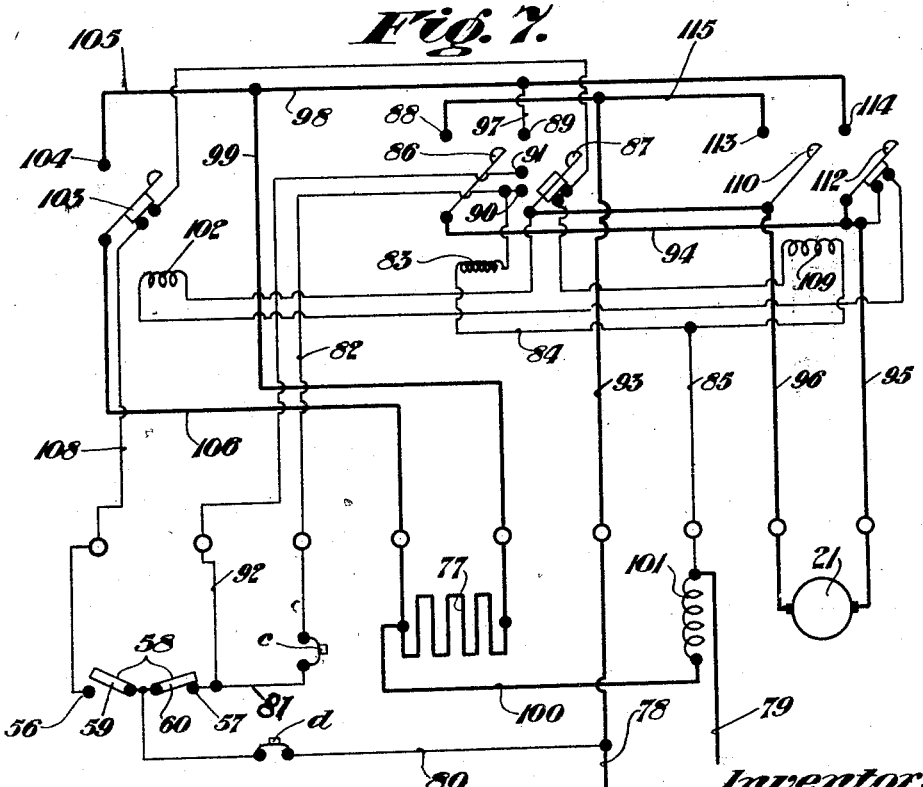
Figure 7 is a diagram of the shear motor control.

The push buttons c and d are the starting and emergency stop buttons for controlling the operation of the shear motor 21 and are included in the control circuit for the motor 21 shown in Figure 7.

An automatic limit and reversing switch C is mounted on the shear housing and is connected in the control circuit to the motor 21 so as to limit the operation of the motor 21 in both its forward and reverse directions and to automatically reverse said motor.

The switch C comprises a casing 55 in which is mounted a pair of stationary contact members 56 and 57, and a pivoted or rocking contact arm 58, having contacts 59 and 60 thereon adapted to contact with the contacts 56 and 57, respectively.

A pair of actuating legs 61 and 62 are pivotally secured to the contact arm 58 at the opposite sides of its pivotal mounting and carry anti-friction rollers 63 and 64 respectively. Coiled springs 65 and 66 have one end connected to the contact arm at opposite sides of the pivotal mounting of said arm and have their other ends connected to the base of the casing 55. A screw shaft 67 is journaled in the casing 55 and projects through the forward end thereof as at 68. The projecting portion 68 of the shaft 67 has a sprocket wheel 69 secured thereon which is connected by a link drive chain 70 to a sprocket 71 secured on the armature shaft 22 of the motor 21, so that when the motor 21 is operated the screw shaft 67 will be operated.

A switch operating shoe 72 is threaded on the shaft 67 and has a sliding connection with a guide rod 73 so as to prevent the shoe from rotating, and compelling the shoe to move longitudinally on the screw shaft 67 when said shaft is rotated.

A resistance box 75 and control box 76 are mounted on the crane trolley 5. The box 75 contains the resistance 77, while the box 76 contains standard switching mechanism which is indicated diagrammatically in Figure 7 of the drawings in which the operating and control circuits are illustrated.

The trolley arms 12 serve to furnish power to the lines 78 and 79 which supply the electric power to the motor 21 through the switching mechanism in the box 76, and the switch C. A pair of separate power lines (not shown) serve to furnish power from the trolley arms 12 to the crane motor 7.

When it is desired to operate the shear the operator will press either the raising or lowering button a or b of the push button control 51, which will cause the crane trolley motor 7 to operate through a standard control (not shown) to raise or lower the shear B to the level of the material to be cut. After the shear is thus positioned the shear blades will be forced over the work-piece and the operator will then push the starting push button c of the push button control, thus closing a circuit from the line 78 through a line 80, contacts 60 and 57 of the switch C, line 81, push button c, line 82, to a coil 83, line 84, and line 85 to line 79. The completion of the above circuit causes the energizing of the coil 83 so as to attract the contactors 86 and 87 and cause them to engage contacts 88 and 89. When the contactor 87 is moved to closed position it also bridges contacts 90 and 91 and closes a control circuit parallel to the one previously closed by the push button c, from the line 81 through the line 92 to the coil 83 so that the push button c may then be released. The closing of the contactors 86 and 87 with the contacts 88 and 89 closes the power circuit to the motor 21 from the line 78 through a line 93, contact 88, contactor 86, lines 94 and 95, to the motor armature, thence through a line 96 and contactor 87 and contact 89 to lines 97 and 98, to line 99, thence through the accelerating resistance 77 and line 100 to the motor series field 101, and to other line 79. When the above power circuit is completed the motor will operate to actuate the shears B and also to operate the automatic switch C. When the motor has made a predetermined number of revolutions, sufficient to move the shear jaws through their cutting movement, the shoe 72 on the screw shaft 67 of the switch C will have moved a sufficient distance to release the contact 60 of the switch C and engage the contact 59 with the contact 56.

Figure 6:
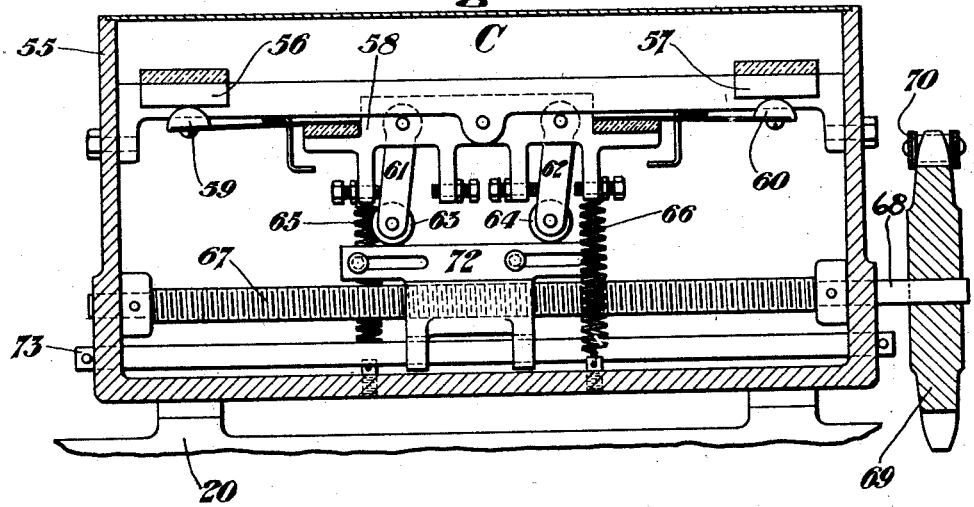
Figure 6 is a sectional elevation through the automatic limit and reversing switch of the shear, showing the position of the switch just prior to the limit of the operation of the motor in either direction.

At a point in the operation of the switch C, just prior to the limit of operation of the motor in either direction the shoe 72 will engage both of the legs 61 and 62 of the switch so as to move both contacts 59 and 60 into closed position (see Figure 6).

However, since the contact 87 controls the circuits made by the contacts 59 and 60, at opposite extreme positions, it can only close one of the circuits at a time. Assuming, therefore, that the contacts 60 and 57 are closed, as shown in Figure 7, and that the shear is being operated, the contacts 59 and 56 will be closed while contacts 60 and 57 are still closed by the shoe 72 engaging the leg 61 of the switch prior to releasing the leg 62. The closing of the contacts 59 and 56 while the contacts 60 and 57 remain closed will not complete any circuits since the contactor 87 will be held in bridging position across the contacts 90 and 91 to continue the holding circuit through the contactor operating coil 83 until the contacts 60 and 57 are opened. When the contacts 60 and 57 are opened, the circuit through the coil 83 will be broken and the contactors 86 and 87 will fall into reverse position with the contactor 87 bridging the gap in the line 108. When the contactor 87 bridges the gap in the line 108, a control circuit will be completed through the operating coil 109 so as to close contactors 110 and 112 and break the circuit to coil 102, since contacts 59 and 56 have been previously closed by the shoe 72 before the contact 60 has been permitted to open. After the shear has operated in the reverse direction and is approaching the end of its reverse travel, the shoe 72 will again engage the leg 62 so as to close the contacts 60 and 57 while the contacts 59 and 56 still remain closed. However, the closing of the contacts 60 and 57 will not complete any circuits while the contacts 59 and 56 remain closed, since the line 81 is broken by the push button c and the line 92 is broken at the contact points 90—91. The shear will therefore continue to operate in the reverse direction until the shoe 72 releases the leg 61 and permits the contact 59 to break contact with the contact 56 when all circuits through the switch C will be broken and the shear motor will come to rest. Now, when it is desired to again start the cycle of operations, it is only necessary to close the push button c to complete the circuit from the contacts 60 and 57 through the line 81 to the holding coil 83, which coil will attract contactors 86 and 87 and contactor 87 will close the gap in line 92 at the contact points 90—91, thus completing a control circuit through the coil 83 and permit the push button c to be released.

When the contactor 87 is moved into position to contact with contact 89 it also closes a circuit to the coil 102 so as to cause the contactor 103 to engage a contact 104 and thus cause the motor circuit to shunt through a line 105 from the line 98, thence through a line 106 to the line 100 so as to short circuit the resistance 77, and allow the full current to flow to the motor 21.

When the contacts 60 and 57 are disengaged in the switch C, the circuits to the coils 83 and 102 are broken, so as to allow the contactors 86, 87, and 103 to drop out. Simultaneous with the disengaging of the contacts 60 and 57, the contacts 59 and 56 of the switch C will be engaged so as to reverse the operation of the motor.

The engaging of the contacts 56 and 59 will complete a circuit from the line 78 through line 80, contacts 59 and 56 to a line 108, to a coil 109, thence through line 85 to the line 79.

Energization of the coil 109 will attract contactors 110 and 112 and cause these contactors to engage contacts 113 and 114, respectively, thereby closing a reverse power circuit to the motor from line 78 to line 115 through contact 113 and contactor 110 to line 96, and back through line 95, the contactor 112 and contact 114 to lines 98, 99, resistance 77, line 100, and motor series field 101 to other line 79.

When the motor is reversed the screw shaft 67 will be operated in the reverse direction so as to cause the shoe 72 to move in the reverse direction, and simultaneous with the return of the shear jaws to their open position, the shoe 72 will be moved out of contact with the leg 62 and into contact with leg 61, so as to permit the switch arm to rock about its pivotal mounting and break the engagement between contacts 56 and 59 to make contact between contacts 57 and 60 again in readiness to complete the circuits first described when the push button c is operated.

From the above it will be apparent that it is only necessary for the operator to depress the push button c for an instant in order to start the above described cycle of operations and that the remainder of the cycle of operations will be controlled automatically.

I claim—

1. The combination with a suspension member, of a circular track member suspended therefrom, and a shear member mounted in said track member and rotatable therein.

2. The combination with a suspension member, of a circular track member suspended therefrom, and a power shear member mounted in said track member and rotatable therein.

3. The combination with a traveling suspension member, of a circular track member suspended therefrom, and a shear member mounted within said track member and rotatable therein.

4. The combination with a vertically adjustable and traveling suspension member, of a circular track member suspended therefrom, and a shear member mounted within said track member and rotatable therein.

5. The combination with a traveling crane having a power-operated vertically adjustable suspension member, of a power-operated shear member suspended from said suspension member, and means on said shear for controlling the operation of said suspension member and said shear.

6. The combination with a traveling crane having a power-operated vertically adjustable suspension member, of a circular track member suspended from said suspension member, and a power-operated shear member mounted within said track member and rotatable therein.

7. The combination with a traveling crane having a power-operated vertically adjustable suspension member, of a circular track member suspended from said suspension member, a power-operated shear member mounted within said track member and rotatable therein, and means on said shear for controlling the operation of said suspension member and said shear.

8. The combination with a traveling crane having a power-operated vertically adjustable suspension member, of a bail ring having a swiveled connection with said suspension member, a circular track member pivotally connected to said bail ring for pivotal movement about a horizontal axis, and a power-operated shear member mounted within said track member and rotatable therein.

9. A power shear comprising a housing, a pair of shear arms pivotally mounted at a point between their ends in said housing, shear blades on the forward ends of said arms, a screw shaft journaled in said housing and having right and left-hand threads thereon, a pair of nut members threaded on said shaft, one of said members being on said right-hand threaded portion of said shaft and the other of said members being on the left-hand threaded portion of said shaft, means forming a pivotal connection between the rear ends of said shear arms and respective ones of said nuts, whereby during rotation of said shaft said nuts will be held against rotation and compelled to move longitudinally of said shaft and rock said shear arms about their pivotal connection with said housing, a reversible motor for rotating said shaft in opposite directions, and means carried on said housing for controlling the operation of said motor, said means including an automatic reversing mechanism operable by said motor.

10. A power shear comprising a housing, a pair of shear arms pivotally mounted at a point between their ends in said housing, a screw shaft journaled in said housing and having right and left-hand threads thereon, a pair of nut members threaded on said shaft, one of said members being on said right-hand threaded portion of said shaft and the other of said members being on the left-hand threaded portion of said shaft, means forming a pivotal connection between the rear ends of said shear arms and respective ones of said nuts, whereby during rotation of said shaft said nuts will be held against rotation and compelled to move longitudinally of said shaft and rock said shear arms about their pivotal connection with said housing, a reversible type electric motor mounted on said housing and having a geared connection with said screw shaft, a push button control on said housing for closing the circuit to start said motor, and an automatic switch mounted on said housing and operated by said motor, said switch being adapted to automatically reverse said motor and break the circuit to said motor at the end of its reverse movement.

In witness whereof, I have hereunto signed my name.

HARLEY C. RALSTON.